(12) United States Patent
Masutani et al.

(10) Patent No.: US 11,156,094 B2
(45) Date of Patent: Oct. 26, 2021

(54) IMPELLER, CENTRIFUGAL COMPRESSOR, GAS TURBINE, AND METHOD OF MANUFACTURING IMPELLER

(71) Applicant: MITSUBISHI HEAVY INDUSTRIES, LTD., Tokyo (JP)

(72) Inventors: Jo Masutani, Tokyo (JP); Kuniaki Aoyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 179 days.

(21) Appl. No.: 16/294,213

(22) Filed: Mar. 6, 2019

(65) Prior Publication Data

US 2019/0277140 A1 Sep. 12, 2019

(30) Foreign Application Priority Data

Mar. 9, 2018 (JP) .............................. JP2018-043386

(51) Int. Cl.
*F01D 5/08* (2006.01)

(52) U.S. Cl.
CPC .......... *F01D 5/082* (2013.01); *F05D 2220/32* (2013.01); *F05D 2230/14* (2013.01); *F05D 2260/20* (2013.01)

(58) Field of Classification Search
CPC .................................................... F01D 5/082
USPC ...................................................... 416/186 R
See application file for complete search history.

(56) References Cited

U.S. PATENT DOCUMENTS

| 2,276,404 | A | 3/1942 | Lundquist | |
| 6,379,117 | B1* | 4/2002 | Ichiryu | F01D 5/081 416/96 R |
| 7,798,388 | B2* | 9/2010 | Crockett | B23K 20/021 228/193 |
| 8,562,285 | B2* | 10/2013 | McCaffrey | F02C 7/28 415/115 |
| 2016/0251981 | A1 | 9/2016 | Hashimoto | |

FOREIGN PATENT DOCUMENTS

| CN | 105637200 | 6/2016 |
| JP | 3157493 | 2/2010 |

* cited by examiner

*Primary Examiner* — Michael L Sehn
(74) *Attorney, Agent, or Firm* — Wenderoth, Lind & Ponack, L.L.P.

(57) ABSTRACT

An impeller includes a plurality of pressurizing flow paths defined by a hub, a shroud, and vanes, the pressurizing flow paths being configured to cause fluid to flow in from a shaft direction of a turbine shaft, and cause the fluid to flow out toward an outer side in a radial direction of the turbine shaft, and the pressurizing flow paths being arranged in a row in a circumferential direction of the turbine shaft. Each of the pressurizing flow paths is a through hole having an inlet and an outlet and penetrating from the inlet to the outlet in a linear manner. The inlet is on an end surface of the impeller in the shaft direction of the turbine shaft. The outlet is on an outer circumferential surface of the impeller on an outer side in the radial direction of the turbine shaft.

10 Claims, 6 Drawing Sheets

IMPELLER, CENTRIFUGAL COMPRESSOR, GAS TURBINE, AND METHOD OF MANUFACTURING IMPELLER

CROSS-REFERENCE TO RELATED APPLICATIONS

The present application claims priority to and incorporates by reference the entire contents of Japanese Patent Application No. 2018-043386 filed in Japan on Mar. 9, 2018.

FIELD

The present invention relates to an impeller, a centrifugal compressor, a gas turbine, and a method of manufacturing an impeller.

BACKGROUND

Conventionally, a closed-type impeller having a cylindrical suction port provided at the center axis portion has been known as an impeller (for example, see Japanese Registered Utility Model No. 3157493). This impeller includes a disc portion and a pair of projections that project from both sides of the disc portion. A suction port is formed inside the projection at one side, and a fluid flow path that continues to the suction port is formed in the disc portion.

A typical closed-type impeller is formed of a hub, a shroud, and a plurality of vanes. In manufacturing such a closed impeller, the hub and the vanes are integrally cut first from a piece of metal block through numerical control (NC) machining. Then, the shroud is affixed to the vanes by welding, brazing, and the like. In this case, because the metal block is cut into a complicated shape including the hub and the vanes through the NC machining, it is difficult to suppress the processing cost. Moreover, because a joint part is formed when the vanes and the shroud are affixed, the joint part may be a portion that may cause deterioration in the structural strength of the impeller.

In Japanese Registered Utility Model No. 3157493, a fluid flow path continued to the suction port is formed in the disc portion. The fluid flow path is linearly formed from the center of the disc portion toward the outside. However, the suction port (inlet) of the impeller and the fluid flow path formed from the suction port to a discharge port (outlet) are formed as separate flow paths. Consequently, it is not possible to integrally form the suction port and the fluid flow path. Thus, it is difficult to simplify the processing, and it has been difficult to suppress the processing cost.

SUMMARY

An impeller according to an aspect of the present invention includes a hub that rotates about a rotating shaft; a shroud provided so as to face the hub in a shaft direction of the rotating shaft; a plurality of vanes provided between the hub and the shroud, and arranged in rows in a circumferential direction of the rotating shaft; and a plurality of pressurizing flow paths that are defined by the hub, the shroud, and the vanes, that cause fluid to flow in from the shaft direction of the rotating shaft, that cause fluid to flow out toward an outer side in a radial direction of the rotating shaft, and that are arranged in a row in the circumferential direction of the rotating shaft. Each of the pressurizing flow paths is a through hole having an inlet and an outlet and formed penetratingly from the inlet to the outlet in a linear manner. The inlet is formed on an end surface of the impeller in the shaft direction of the rotating shaft. The outlet is formed on an outer circumferential surface of the impeller on an outer side in the radial direction of the rotating shaft. In a plane viewed from the shaft direction of the rotating shaft, a penetrating direction of the through hole that extends from the inlet to the outlet is a tangential direction at the inlet that is orthogonal to a line segment connecting a center of the rotating shaft and the inlet.

DESCRIPTION OF EMBODIMENTS

Hereinafter, embodiments according to the present invention will be described in detail with reference to the accompanying drawings. It is to be understood that this invention is not limited to the embodiments. Moreover, components in the following embodiments include components that can be easily replaced by those skilled in the art, or components substantially the same as those components. Furthermore, the components described below can be combined with one another as appropriate. Still furthermore, when there are a plurality of embodiments, the embodiments may be combined with one another.

First Embodiment

Figure 1:
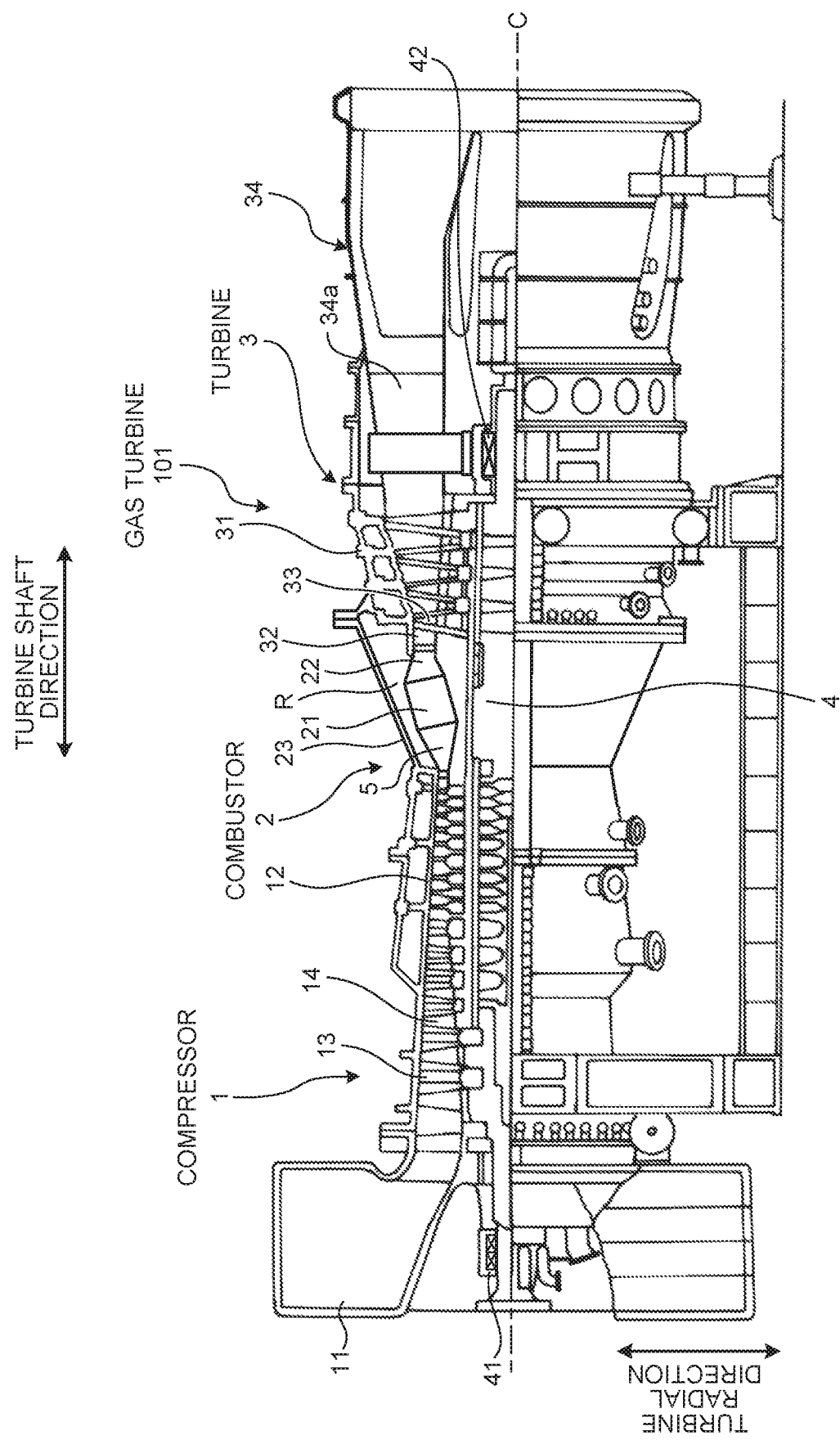
FIG. 1 is a schematic configuration diagram of a gas turbine according to a first embodiment.
Figure 2:
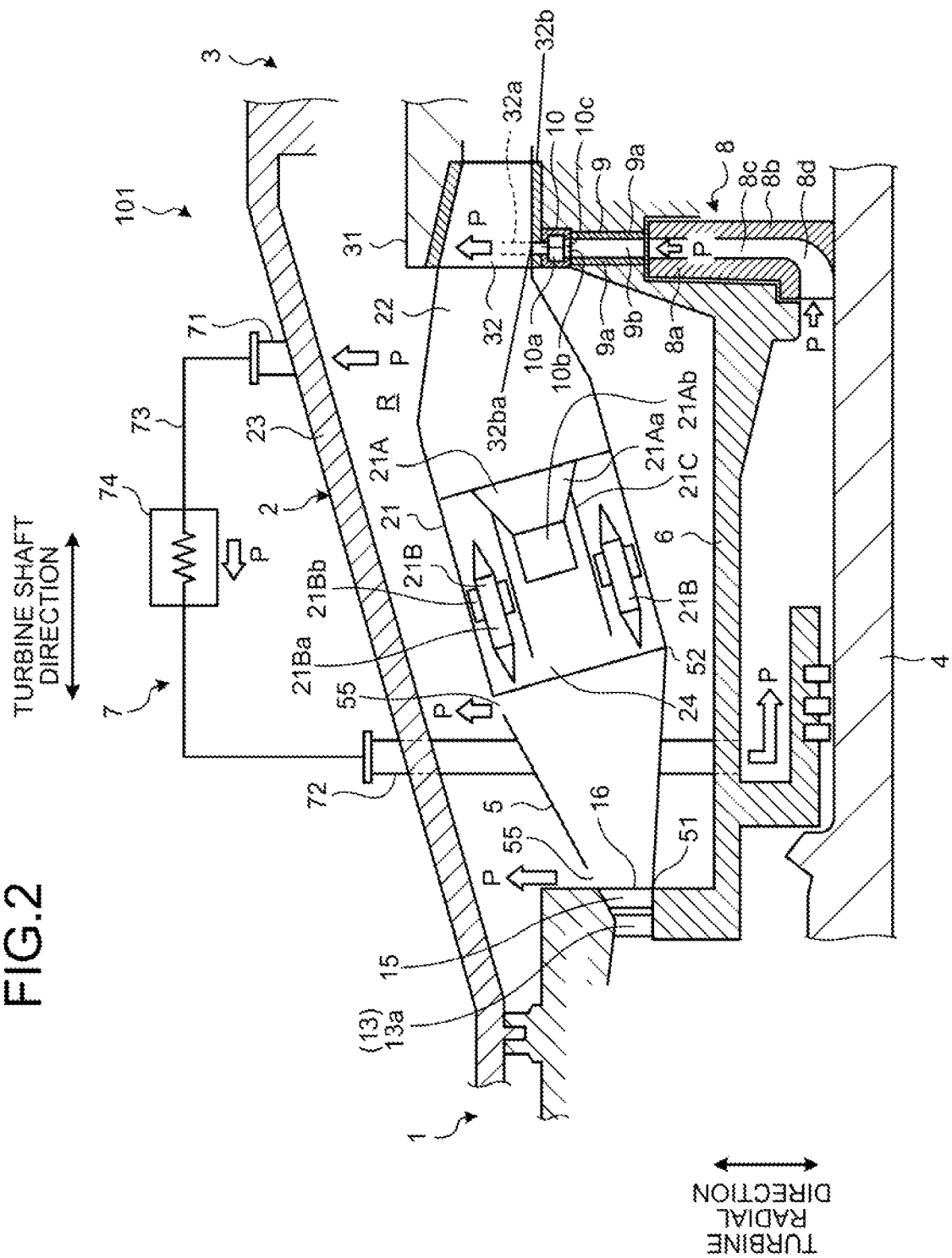
FIG. 2 is an enlarged sectional view around a combustor of the gas turbine according to the first embodiment.
Figure 3:
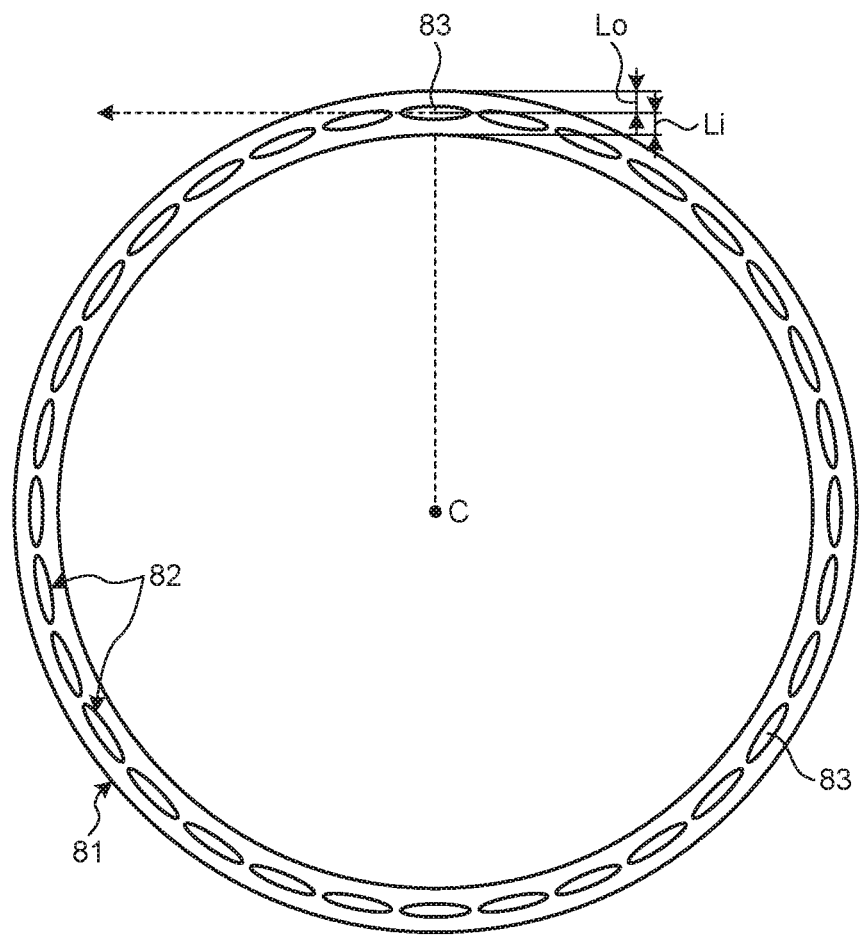
FIG. 3 is a plan view of an impeller according to the first embodiment.
Figure 4:
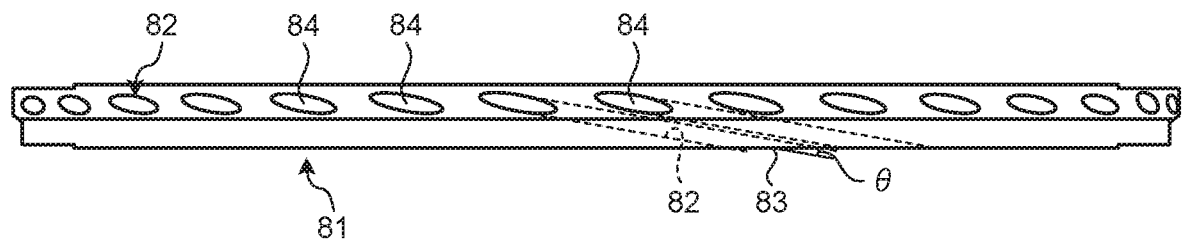
FIG. 4 is a side view of the impeller according to the first embodiment.
Figure 5:
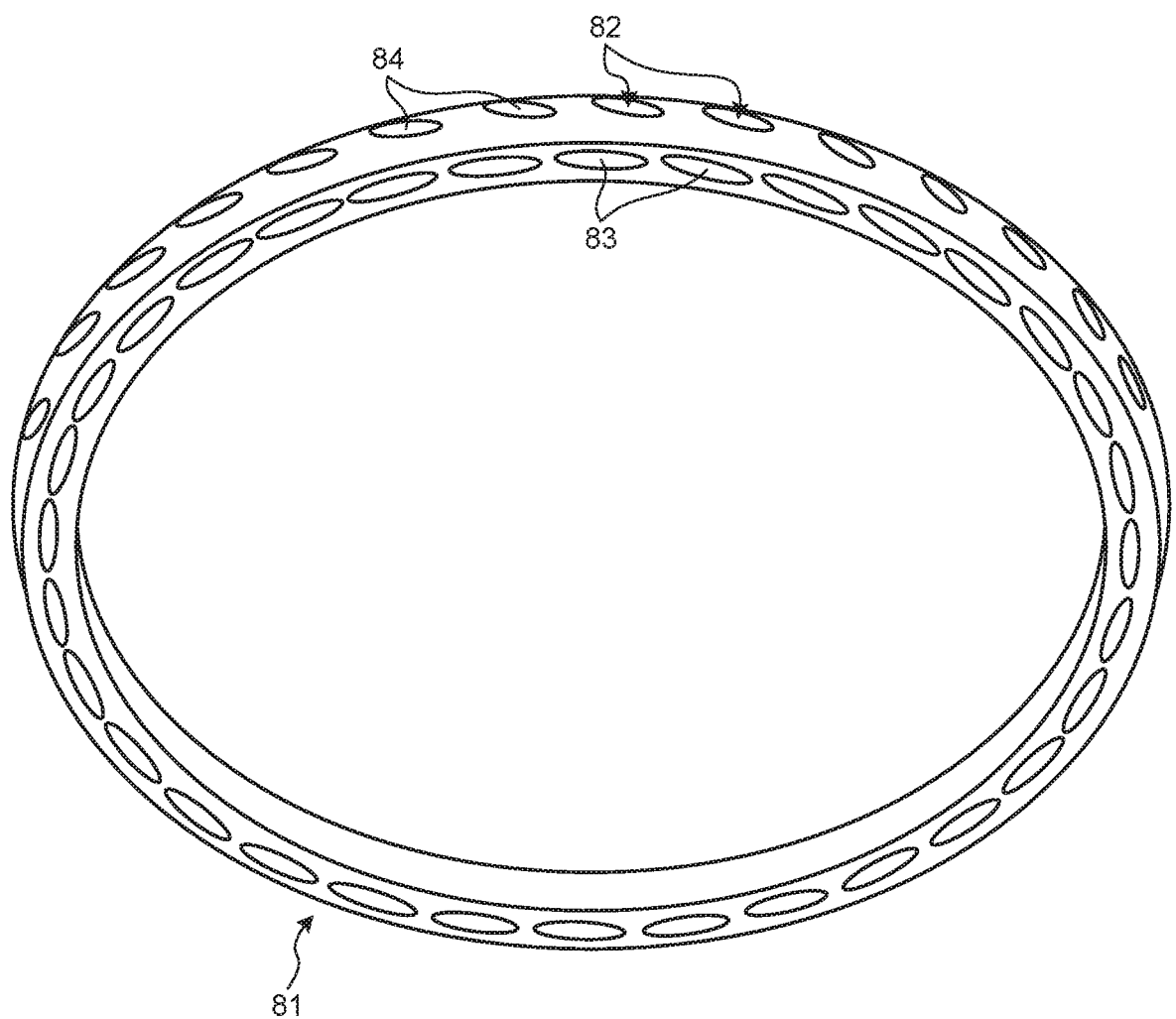
FIG. 5 is a perspective view of the impeller according to the first embodiment.
Figure 6:
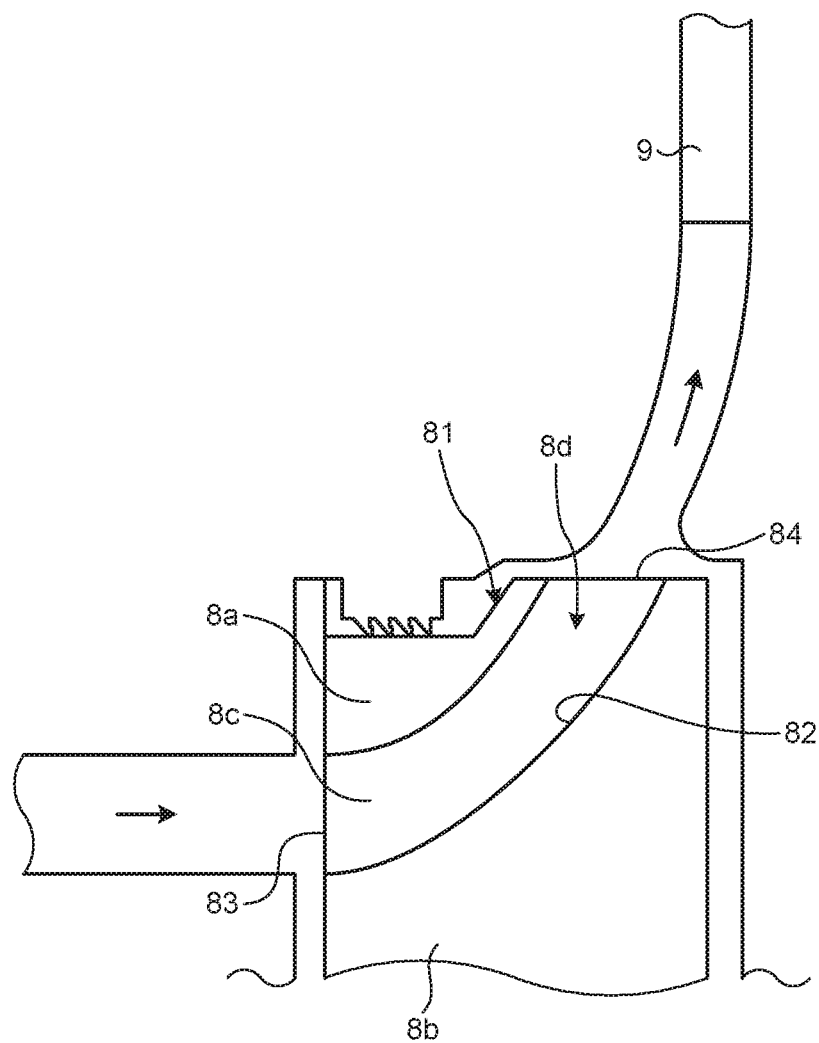
FIG. 6 is a schematic sectional view illustrating a meridian cross section of the impeller according to the first embodiment.

FIG. 1 is a schematic configuration diagram of a gas turbine according to a first embodiment. FIG. 2 is an enlarged sectional view around a combustor of the gas turbine according to the first embodiment. FIG. 3 is a plan view of an impeller according to the first embodiment. FIG. 4 is a side view of the impeller according to the first embodiment. FIG. 5 is a perspective view of the impeller according to the first embodiment. FIG. 6 is a schematic sectional view illustrating a meridian cross section of the impeller according to the first embodiment.

As illustrated in FIG. 1, a gas turbine 101 includes a compressor 1, a combustor 2, and a turbine 3. In the gas turbine 101, a turbine shaft 4 that is a rotating shaft is arranged to pass through the center portions of the compressor 1, the combustor 2, and the turbine 3. The compressor 1, the combustor 2, and the turbine 3 are arranged in a row, sequentially from the front side toward the rear side in the direction of the air flow along a center axis C of the turbine shaft 4. In the following explanation, a turbine shaft direction refers to a direction parallel to the center axis C, a turbine circumferential direction refers to a direction of rotation about the center axis C, and a turbine radial direction refers to a direction orthogonal to the center axis C. An inner side in the turbine radial direction refers to a side nearer to the center axis C in the turbine radial direction, and an outer side in the turbine radial direction refers to a side more distanced from the center axis C in the turbine radial direction.

The compressor 1 compresses air into compressed air. The compressor 1 includes compressor vanes 13 and compressor blades 14 that are provided inside a compressor casing 12 having an air intake 11 for taking in air. The compressor casing 12 is formed in a cylindrical shape. A plurality of the compressor vanes 13 are attached on the side of the compressor casing 12 and are arranged in rows along the turbine circumferential direction. A plurality of the compressor blades 14 are attached to the side of the turbine shaft 4 and are arranged in rows in the turbine circumferential direction around the turbine shaft 4. The compressor vanes 13 and the compressor blades 14 are provided alternatingly along the turbine shaft direction. The compressor 1 has an outlet 16 provides with a plurality of last stage vanes 13*a* are arranged in a row along in the turbine circumferential direction. In the compressor 1, the outlet 16 may be provided with a plurality of exit guide vanes 15 that are arranged in a row along the turbine circumferential direction, at a position downstream of the last stage vanes 13*a*.

The combustor 2 generates high-temperature and high-pressure combustion gas, by supplying fuel to the compressed air compressed by the compressor 1. The combustor 2 includes a combustion chamber 21 in which the compressed air is mixed with the fuel and combusted, and a transition piece 22 that guides the combustion gas from the combustion chamber 21 to the turbine 3. A plurality of (for example, sixteen) the combustion chambers 21 are arranged in a row around the turbine shaft 4 along the turbine circumferential direction inside a combustor casing 23 having a cylindrical shape that forms a combustor casing chamber R.

As illustrated in FIG. 2, each of the combustion chambers 21 has a tubular shape. Inside of the combustion chamber 21, a pilot combustion burner 21A is disposed at the center. In the combustion chamber 21, a plurality of main combustion burners 21B are disposed along the inner circumferential surface of the combustion chamber 21 so as to surround the pilot combustion burner 21A. The pilot combustion burner 21A includes a pilot cone 21Aa supported by the combustion chamber 21, and a pilot nozzle 21Ab disposed inside the pilot cone 21Aa. Each of the main combustion burners 21B includes a main nozzle 21Ba, and a swirler vane 21Bb provided on the outer circumferential of the main nozzle 21Ba. In the combustion chamber 21, a pilot fuel line, which is not illustrated, is coupled to the pilot nozzle 21Ab, and a main combustion line, which is not illustrated, is coupled to each of the main nozzles 21Ba. In the combustion chamber 21, an inner cylinder 21C that surrounds the pilot combustion burner 21A forms a flow path for sending the compressed air to the pilot combustion burner 21A, on the inner side of the inner cylinder 21C, and also forms a flow path for sending the compressed air to the main combustion burner 21B, on the outer side of the inner cylinder 21C. The combustion chamber 21 has its tube-shaped axis along the turbine shaft direction, and an air inlet 24 is provided as a tube-shaped opening. This air inlet 24 is disposed facing the outlet 16 of the compressor 1. When the high-temperature and high-pressure compressed air flows into the combustion chamber 21 through the air inlet 24, the compressed air becomes mixed with the fuel injected from the main combustion burners 21B, and is turned into swirling flows of premixed gas. The compressed air also becomes mixed with the fuel injected from the pilot combustion burner 21A, is ignited by a pilot flame, which is not illustrated, becomes combusted and is turned into combustion gas, and discharged into the combustion chamber 21. At this time, a part of the combustion gas is discharged with flames, in a manner to diffusing inside the combustion chamber 21, is ignited by the premixed gas flowed out from the main combustion burners 21B to the inside of the combustion chamber 21, and becomes combusted. In other words, with the diffusion flame resulting from the pilot fuel injected from the pilot combustion burner 21A, it is possible to achieve the flame stabilization for ensuring the stable combustion with the lean premixed fuel supplied from the main combustion burner 21B.

Each of the combustion chambers 21 is connected to the compressor 1 via a compressor diffuser 5. The compressor diffuser 5 is a tubular body forming an air passage for leading the compressed air from the compressor 1 to the combustion chambers 21. One end 51 of the compressor diffuser 5 is connected to the outlet 16 of the compressor 1, and the other end 52 of the compressor diffuser 5 is connected to the air inlet 24 of the combustion chamber 21 included in the combustor 2, so that the compressor 1 and each of the combustors 2 are connected thereby.

The turbine 3 generates a rotational driving force using the combustion gas resultant of the combustion in the combustor 2. The turbine 3 includes turbine vanes 32 and turbine blades 33 are provided inside a cylindrical turbine casing 31. A plurality of the turbine vanes 32 are attached to the side of the turbine casing 31 and are arranged in rows along the turbine circumferential direction. The turbine blades 33 are attached to the side of the turbine shaft 4 and are arranged in rows along the turbine circumferential direction. The turbine vanes 32 and the turbine blades 33 are provided alternatingly in the turbine shift direction. At the rear side of the turbine casing 31, an exhaust chamber 34 including an exhaust diffuser 34*a* disposed continuously to the turbine 3 is provided.

The end portion of the turbine shaft 4 on the side of the compressor 1 is supported by a bearing part 41, and the end portion of the turbine shaft 4 on the side of the exhaust chamber 34 is supported by a bearing part 42. In this manner, the turbine shaft 4 is provided rotatably about the center axis C. Although not illustrated, the end portion of the turbine shaft 4 on the side of the compressor 1 is coupled to a driving shaft of a generator.

In the gas turbine 101 as described above, the air taken in from the air intake 11 of the compressor 1 is passed between the compressor vanes 13 and the compressor blades 14, and compressed into high-temperature and high-pressure air. The compressed air is then mixed with the fuel and combusted in the combustor 2, so that high-temperature and high-pressure combustion gas is generated thereby. This combustion gas is then passed between the turbine vanes 32 and the turbine blades 33 of the turbine 3, and drives the turbine shaft 4 in rotation, applying a rotational driving force to the generator that is coupled to the turbine shaft 4. In this manner, electric power is generated. Flue gas having driven the turbine shaft 4 in rotation is passed through the exhaust diffuser 34*a* in the exhaust chamber 34, and is discharged to the atmosphere as flue gas.

In the gas turbine 101 according to the first embodiment, the compressor diffuser 5 includes an air bleed port 55. The air bleed port 55 is formed as a hole that communicates with the inside and the outside of the compressor diffuser 5, to bleed the compressed air from the compressor diffuser 5. In the first embodiment, the air bleed port 55 is provided at least on one of one end 51 and the other end 52 of the compressor diffuser 5. For example, the air bleed port 55 is a hole formed at the edge of the one end 51 or the edge of the other end 52 of the compressor diffuser 5. Therefore, the air bleed port 55 takes out a part of compressed air P that is to be sent from the compressor 1 to the combustion chamber 21 via the compressor diffuser 5, to the inside of the combustor casing 23 having a cylindrical shape that forms the combustor casing chamber R.

In relation to the air bleed port 55, the gas turbine 101 includes an intermediate shaft cover 6 that is attached to the outer circumference of the turbine shaft 4, and having a ring-like shape extending along the turbine circumferential direction. On the outer circumference of this intermediate shaft cover 6, the combustor casing chamber R is defined inside the combustor casing 23, on the outer side of the combustion chambers 21.

The gas turbine 101 according to the first embodiment also includes a cooling device 7. The cooling device 7 includes an air discharge pipe 71 leading from the combustor casing chamber R to the outside of the combustor casing 23; an air supply pipe 72 leading from the outside of the combustor casing 23 to the inside of the intermediate shaft cover 6 (to the side of the turbine shaft 4) by penetrating the combustor casing 23; a cooling air pipe 73 by which the air discharge pipe 71 communicates with the air supply pipe 72; and a heat exchanger (turbine cooling air (TCA) cooler) 74 that is provided at a midpoint along the cooling air pipe 73.

Consequently, the compressed air P taken out via the air bleed port 55 into the combustor casing chamber R is discharged to the cooling air pipe 73 provided outside the combustor casing 23 via the air discharge pipe 71. Then, the compressed air P exchanges heat with coolant in the heat exchanger 74 and is turned into cooling air. The cooling air is then supplied to the inside of the intermediate shaft cover 6 via the air supply pipe 72. With this cooling air, which is the cooled compressed air P, parts such as the turbine vanes 32, the turbine blades 33, and the turbine shaft 4 can be cooled.

The gas turbine 101 according to the first embodiment also includes a pressurizing device 8, a diffuser 9, and a manifold 10.

The pressurizing device 8 is provided inside the intermediate shaft cover 6, on the inner side of the turbine vanes 32 (the first stage turbine vanes 32 disposed in an inlet of the turbine 3 in the first embodiment), in the turbine radial direction. The pressurizing device 8 is provided as what is called a centrifugal compressor that includes an impeller 81 of a closed type that is fixed to the turbine shaft 4. The impeller 81 includes a shroud 8a, a hub 8b that faces the shroud 8a in the turbine shaft direction, and vanes 8c provided between the shroud 8a and the hub 8b. A pressurizing flow path 8d extending along the turbine shaft direction and then directed toward the outer side in the turbine radial direction is formed between the shroud 8a and the hub 8b. In the pressurizing device 8, the shroud 8a, the hub 8b, and the vane 8c are caused to rotate with the rotation of the turbine shaft 4, so that the cooling air, which is the cooled compressed air P, supplied by the cooling device 7 to the inside of the intermediate shaft cover 6 is then suctioned from the turbine radial direction into the pressurizing flow path 8d between the shroud 8a and the hub 8b. The cooling air is then discharged from the pressurizing flow path 8d to the outer side in the turbine radial direction while having the pressure increased.

The diffuser 9 is fixed to the turbine casing 31 and is provided in a manner continuous to the pressurizing device 8 in the turbine circumferential direction, on the outer side of the pressurizing device 8 in the turbine radial direction. The diffuser 9 includes a pair of guiding plates 9a that are plate members together formed in a ring shape by being disposed in a manner facing each other along the turbine shaft direction with the turbine shaft 4 at the center, and forms a passage 9b having a sectional area increasing toward the outer side in the turbine radial direction. The passage 9b is disposed in such a manner that the end of the passage 9b on the inner side in the turbine radial direction faces the outer end of the pressurizing flow path 8d of the pressurizing flow path 8d in the turbine radial direction, that is, the outlets of the pressurizing flow path 8d. Consequently, the diffuser 9 decelerates the cooling air, which is the cooled compressed air P, having pressure increased by the pressurizing device 8 on the outer side of the pressurizing device 8 in the turbine radial direction and having been discharged from the pressurizing flow path 8d, while guiding the cooling air to the outer side in the turbine radial direction. The diffuser 9 may include, as the passage 9b, an annular space formed by the turbine casing 31 without being provided with the guiding plates 9a. Furthermore, the diffuser 9 may be provided, inside the passage 9b, with fixed vanes for adjusting the flows of the cooling air, which is the cooled compressed air P, toward the outer side in the turbine radial direction.

The manifold 10 is fixed to the turbine casing 31 and, as illustrated in FIG. 2, is disposed between the diffuser 9 and the turbine vanes 32 arranged in rows along the turbine circumferential direction. The manifold 10 has a ring-shaped passage 10a that is continuous in the turbine circumferential direction around the turbine shaft 4. The ring-shaped passage 10a in the manifold 10 has an opening 10b that is opened continuously in the turbine circumferential direction on the inner side in the turbine radial direction. The manifold 10 is coupled to the diffuser 9 in such a manner that the opening 10b communicates with the outer end in the turbine radial direction of the passage 9b of the diffuser 9. The manifold 10 also has a plurality of holes 10c formed penetratingly in the turbine radial direction on the outer side of the ring-shaped passage 10a, and arranged in a row along the turbine circumferential direction. The manifold 10 is then coupled to shroud parts 32b of the turbine vanes 32 in such a manner that the hole 10c communicates with a cooling passage 32a provided in each of the turbine vanes 32. A plurality of the cooling passages 32a are formed inside a single turbine vane 32, and the cooling passages 32a are merged to a single inlet part 32ba of the shroud part 32b on the inner side in the turbine radial direction, and the holes 10c are formed so as to communicate with the respective inlet parts 32ba. Consequently, the manifold 10 serves to supply the cooling air, which is the cooled compressed air P, having been guided the diffuser 9 to the outer side in the turbine radial direction into the cooling passages 32a of the turbine vanes 32, while guiding the cooling air along the turbine circumferential direction.

In the gas turbine 101 as described above, the diffuser 9 guides the cooling air, which is the cooled compressed air P, having the pressure increased by the pressurizing device 8 to the outer side in the turbine radial direction, and the manifold 10 supplies the cooling air, which is the cooled compressed air P, guided by the diffuser 9 to the outer side in the turbine radial direction into the cooling passage 32a in the turbine vanes 32. Consequently, it is possible to reduce the pressure loss of the cooling air, which is the cooled compressed air P, having the pressure increased by the pressurizing device 8 and to be supplied to the turbine vanes 32.

Next, with reference to FIG. 3 to FIG. 6, the impeller 81 of the pressurizing device 8 will be described. Because the impeller 81 is fixed to the turbine shaft 4, the impeller 81 is formed in an annular shape. Because the diameter of the turbine shaft 4 is large while the installation space of the impeller 81 is limited, the inner diameter and the outer diameter of the impeller 81 are large, and the difference between the inner and outer diameters is small. The width of the impeller 81 in the turbine shaft direction is narrow.

The impeller 81 introduces the cooling air (compressed air P) as fluid from the turbine shaft direction, and discharges the cooling air toward the outer side in the turbine radial direction. As described above, the impeller 81 includes the hub 8b, the shroud 8a, and a plurality of the vanes 8c. A plurality of the pressurizing flow paths 8d are defined by the hub 8b, the shroud 8a, and the vanes 8c. In other words, to form the impeller 81, the pressurizing flow paths 8d are formed in an annular-shaped member, so that the impeller 81 having the hub 8b, the shroud 8a, and the vanes 8c that are integrally formed is formed.

The pressurizing flow path 8d includes an inlet 83 formed on the end surface of the impeller 81 in the turbine shaft direction, and an outlet 84 formed on the outer circumferential surface of the impeller 81 on the outer side in the turbine radial direction. The pressurizing flow path 8d is formed by a through hole 82 formed penetratingly from the inlet 83 to the outlet 84 in a linear manner. Consequently, the pressurizing flow paths 8d are disposed by arranging the through holes 82 in a row in the turbine circumferential direction in point symmetry with respect to the center axis C. The through hole 82 is formed into a round hole the cross section of which is a circular shape.

As illustrated in FIG. 3, the inlet 83 formed on the end surface of the impeller 81 in the turbine shaft direction extends in a tangential direction orthogonal to a line segment in the turbine radial direction connecting the center of the inlet 83 and the center axis C. In other words, in the plane viewed from the turbine shaft direction, the through hole 82 is formed penetratingly in a direction along the tangential direction from the center of the inlet 83.

Moreover, as illustrated in FIG. 4, the outlet 84 formed on the outer circumferential surface on the outer side in the turbine radial direction is formed in such a manner that the extending direction of the outlet 84 is inclined with respect to the plane orthogonal to the turbine shaft direction. In short, the through hole 82 extends in a predetermined penetrating direction (inclination direction) with respect to the plane orthogonal to the turbine shaft direction. In other words, the through hole 82 is formed penetratingly in such a manner that the inclination angle θ with respect to a plane orthogonal to the turbine shaft direction becomes a predetermined inclination angle. In this example, the penetrating direction of the through hole 82 is a direction along the direction of a relative inflow angle of the cooling air that flows into the inlet 83. More specifically, the predetermined inclination angle θ of the through hole 82 is, for example, within a range of about ±5 degrees with respect to the relative inflow angle of the cooling air that flows into the inlet 83.

Referring to FIG. 3 again, it is possible to increase the compression performance of the impeller 81, by increasing gradually from the inlet 83 toward the outlet 84 the distance from the center axis C to the pressurizing flow path 8d in the radial direction. In short, the compression performance of the impeller 81 can be increased with an increase in the difference between the distance from the center axis C to the inlet 83 in the turbine radial direction, and the distance from the center axis C to the outlet 84 in the turbine radial direction. Consequently, in a plane viewed from the turbine shaft direction, distance Li between the inner circumferential surface of the hub 8b and (the center of) the inlet 83 in the turbine radial direction is shorter than distance Lo between (the center of) the inlet 83 and the outer circumferential surface of the shroud 8a. Consequently, because the inlet 83 can be brought close to the center axis C, it is possible to increase the difference described above. In the first embodiment, the distance Li is shorter than the distance Lo. However, the present invention is not limited thereto, and the distance Li and the distance Lo may also be the same.

Next, a method of manufacturing the impeller 81 described above will be explained. To manufacture the impeller 81 described above, an annular-shaped member including the outer shapes of the hub 8b, the shroud 8a, and the vanes 8c is first prepared. In other words, an annular-shaped member having a shape before the pressurizing flow paths 8d are formed is prepared. A machining step is executed for penetratingly forming the through hole 82 in the annular-shaped member so as to make the pressurizing flow path 8d.

In the machining step, the linear through hole 82 is penetratingly formed in the annular-shaped member, by a cutting machining such as drilling machining or milling machining. At this time, in the plane viewed from the turbine shaft direction, the penetrating direction of the through hole 82 is a direction from the center of the inlet 83 to be formed toward the tangential direction orthogonal to the turbine radial direction. Furthermore, in the plane viewed from the turbine radial direction, the penetrating direction of the through hole 82 is a direction of the inclination angle θ that is the relative inflow angle of the cooling air that flows into the inlet 83.

Then, after the machining step is executed, the polishing step of polishing the inner surface of the through hole 82 may be executed. At the polishing step, the flow path resistance of the through hole 82 is reduced by polishing the inner surface of the through hole 82 so as to be smooth.

As described above, according to the first embodiment, it is possible to form the pressurizing flow path 8d by simple machining, by forming the through hole 82 penetratingly in a linear manner. Consequently, it is possible to reduce the manufacturing cost. Moreover, because it is possible to form the pressurizing flow path 8d by forming the through hole 82, there is no need to separately manufacture the hub 8b, the shroud 8a, and the vanes 8c. Thus, it is possible to integrally form the hub 8b, the shroud 8a, and the vanes 8c without forming a joint part to the hub 8b, the shroud 8a, and the vanes 8c. In other words, by integrally forming the hub 8b, the shroud 8a, and the vanes 8c, there is no need to form the joint part. Thus, it is possible to improve the structural strength of the impeller 81.

Furthermore, according to the first embodiment, the penetrating direction of the through hole 82 is a direction from the center of the inlet 83 toward the tangential direction. Consequently, it is possible to increase gradually from the inlet 83 toward the outlet 84 the distance from the center axis C to the pressurizing flow path 8d in the radial direction. Thus, it is possible to form the impeller 81 that can suitably exert the pressurizing function.

Furthermore, according to the first embodiment, it is possible to make the penetrating direction of the through hole 82 coincide with the direction along the direction of the relative inflow angle of the cooling air that flows into the inlet 83. More specifically, as described above, it is possible to suitably introduce the cooling air to the pressurizing flow path 8*d* via the inlet 83, by making the inclination angle θ of the through hole 82 within a range of about ±5 degrees with respect to the relative inflow angle of the cooling air.

Still furthermore, according to the first embodiment, it is possible to reduce the distance from the center axis C to the inlet 83 in the radial direction, by reducing the distance between the inner circumferential surface of the hub 8*b* and the inlet 83. Consequently, it is possible to further increase gradually from the inlet 83 toward the outlet 84 the distance from the center axis C to the pressurizing flow path 8*d* in the radial direction. Thus, it is possible to further increase the pressurizing function of the impeller 81.

Still furthermore, according to the first embodiment, it is possible to effectively perform the machining operation with a simple machining facility, by forming the through hole 82 by drilling machining or milling machining. Consequently, it is possible to further reduce the machining cost.

Still furthermore, according to the first embodiment, it is possible to smooth the inner circumferential surface of the through hole 82 by polishing. Consequently, it is possible to suppress an increase in the flow path resistance in the pressurizing flow path 8*d*.

Second Embodiment

Figure 7:
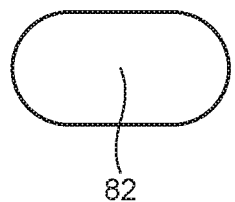
FIG. 7 is a sectional view of a through hole of an impeller according to a second embodiment.
Figure 8:
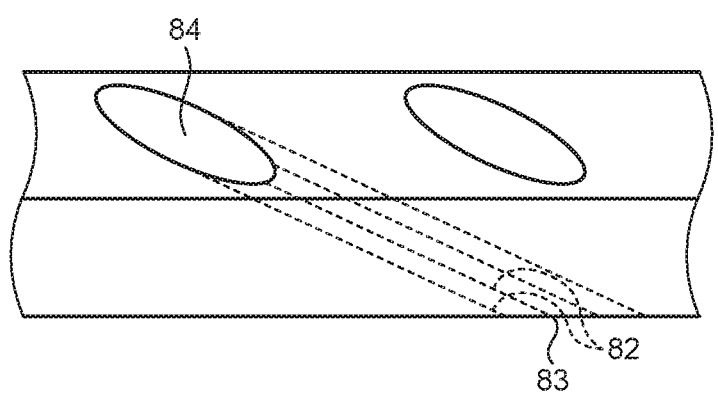
FIG. 8 is an enlarged side view of a part of the impeller according to the second embodiment.

Next, with reference to FIG. 7 and FIG. 8, the impeller 81 according to a second embodiment will be described. In the second embodiment, to prevent repetition, only portions different from those of the first embodiment will be described, and the portions the same as those of the first embodiment denote the same reference numerals. FIG. 7 is a sectional view of a through hole of an impeller according to the second embodiment. FIG. 8 is an enlarged side view of a part of the impeller according to the second embodiment.

In the impeller 81 of the second embodiment, the sectional area of the flow path of the through hole 82 formed extending from the inlet 83 to the outlet 84 is increased than that of the through hole 82 in the first embodiment. More specifically, the through hole 82 of the first embodiment is a round hole the cross section of which is a circular shape. However, as illustrated in FIG. 7, the through hole 82 of the second embodiment is formed in a long hole the cross section of which is an oval shape. In other words, the through hole 82 of the second embodiment has a shape in which the adjacent through holes 82 in the first embodiment are joined.

The cross-section of the through hole 82 in the second embodiment cut by a plane orthogonal to the penetrating direction has a shape including two semi-circular arcs and two straight lines that connect both end portions of the arcs that face each other. For example, when drilling machining is performed, the through hole 82 of the second embodiment is formed into a long hole by continuously placing two round holes in parallel. When milling machining is performed, the through hole 82 of the second embodiment is formed into a long hole by moving the mill in parallel.

The through hole 82 of the second embodiment is formed into a long hole by placing a plurality of the round holes continuously in parallel. However, the present invention is not limited thereto. The through hole 82 of the second embodiment may be formed by continuously placing one hole and the other hole in a diagonal direction in such a manner that the sectional area of the flow path is increased gradually from the inlet 83 side toward the outlet 84 side of the pressurizing flow path 8*d*. In short, the round holes may be continuously formed in such a manner that the round holes are widen gradually from the inlet 83 toward the outlet 84 side.

In this manner, according to the second embodiment, it is possible to increase the sectional area of the flow path of the through hole 82 compared to that of the first embodiment. Consequently, it is possible to take in more cooling air. Moreover, it is possible to discharge more compressed cooling air.

Furthermore, according to the second embodiment, the flow velocity of the cooling air at the outlet 84 can be reduced, by forming the through hole 82 so that the sectional area of the flow path is increased gradually from the inlet 83 side toward the outlet 84 side. Consequently, it is possible to improve the compression efficiency.

In the first embodiment and the second embodiment, the shape of the through hole 82 is formed into a round hole or a long hole in consideration of drilling machining or milling machining. However, for example, to further increase the sectional area of the flow path of the through hole 82, the shape of the through hole 82 may be formed into an angle hole the cross section of which is a rectangular shape. In this case, the through hole 82 may be formed into the angle hole by electric discharge machining and the like.

While certain embodiments have been described, these embodiments are not intended to limit the scope of the inventions. The components in the embodiments include ones that a person skilled in the art can easily conceive of, ones that are substantially the same, or ones that fall within their equivalents. Furthermore, various omissions, substitutions, combinations, and changes may be made as appropriate to configurations of the components disclosed in the embodiments without departing from the spirit of the inventions.

What is claimed is:

1. An impeller comprising:
a hub configured to rotate about a rotatable shaft;
a shroud facing the hub in a shaft direction of the rotatable shaft;
a plurality of vanes provided between the hub and the shroud, and arranged in rows in a circumferential direction of the rotatable shaft; and
a plurality of pressurizing flow paths defined by the hub, the shroud, and the vanes, the pressurizing flow paths being configured to cause fluid to flow in from the shaft direction of the rotatable shaft, and cause the fluid to flow out toward an outer side in a radial direction of the rotatable shaft, and the pressurizing flow paths being arranged in a row in the circumferential direction of the rotatable shaft,
wherein:
each of the pressurizing flow paths is a through hole having an inlet and an outlet and penetrating from the inlet to the outlet in a linear manner, the inlet being on an end surface of the impeller in the shaft direction of the rotatable shaft, the outlet being on an outer circumferential surface of the impeller on an outer side in the radial direction of the rotatable shaft; and
in a plane viewed from the shaft direction of the rotatable shaft, a penetrating direction of the through hole that extends from the inlet to the outlet is a tangential direction at the inlet that is orthogonal to a line segment connecting a center of the rotatable shaft and the inlet.

2. The impeller according to claim 1, wherein, in a plane viewed from the radial direction of the rotatable shaft, an inclination direction of the through hole with respect to the end surface of the impeller in the shaft direction of the rotatable shaft extends along a direction of a relative inflow angle of the fluid at the inlet.

3. The impeller according to claim 1, wherein:
   the hub and the shroud are in an annular shape with an insertion hole at a shaft center configured to receive the rotatable shaft; and
   in the plane viewed from the shaft direction of the rotatable shaft, a distance between an inner circumferential surface of the hub and the inlet is shorter than a distance between the inlet and an outer circumferential surface of the shroud.

4. A centrifugal compressor comprising:
   the impeller according to claim 1; and
   the rotatable shaft,
   wherein the rotatable shaft is connected to the impeller and configured to rotate the impeller.

5. A gas turbine comprising:
   a compressor configured to take in air and compress the air;
   a combustor configured to mix and combust compressed air compressed by the compressor and a fuel;
   a turbine configured to rotate with combustion gas generated by combusting the fuel by the combustor; and
   the centrifugal compressor according to claim 4, the centrifugal compressor being configured to take in and pressurize the compressed air bled from the compressor and discharge the compressed air being pressurized as cooling air.

6. The impeller according to claim 1, wherein the vanes are sandwiched between the hub and the shroud.

7. A method of manufacturing an impeller that includes:
   a hub configured to rotate about a rotatable shaft;
   a shroud facing the hub in a shaft direction of the rotatable shaft;
   a plurality of vanes provided between the hub and the shroud, and arranged in rows in a circumferential direction of the rotatable shaft; and
   a plurality of pressurizing flow paths defined by the hub, the shroud, and the vanes, the pressurizing flow paths being configured to cause fluid to flow in from the shaft direction of the rotatable shaft, and cause the fluid to flow out toward an outer side in a radial direction of the rotatable shaft, and the pressurizing flow paths being arranged in a row in the circumferential direction of the rotatable shaft,
   each of the pressurizing flow paths having an inlet on an end surface of the impeller in the shaft direction of the rotatable shaft, and an outlet on an outer circumferential surface of the impeller on an outer side in the radial direction of the rotatable shaft,
   the method comprising:
   for each of the pressurizing flow paths, forming a through hole penetrating from the inlet toward the outlet in a linear manner so as to define the pressurizing flow path.

8. The method according to claim 7, wherein the vanes are sandwiched between the hub and the shroud.

9. The method according to claim 7, wherein the through hole is formed by drilling machining or milling machining.

10. The method according to claim 7, further comprising polishing an inner circumferential surface of the through hole.

* * * * *